United States Patent
Snow et al.

(10) Patent No.: US 10,598,035 B2
(45) Date of Patent: Mar. 24, 2020

(54) INTERSHAFT SEALING SYSTEMS FOR GAS TURBINE ENGINES AND METHODS FOR ASSEMBLING THE SAME

(71) Applicant: General Electric Company, Schnectady, NY (US)

(72) Inventors: Kyle Robert Snow, Loveland, OH (US); Daniel Scott Tomasic, West Chester, OH (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 15/166,917

(22) Filed: May 27, 2016

(65) Prior Publication Data

US 2017/0342848 A1  Nov. 30, 2017

(51) Int. Cl.
*F01D 11/00* (2006.01)
*F01D 25/18* (2006.01)

(52) U.S. Cl.
CPC ............ *F01D 11/003* (2013.01); *F01D 25/18* (2013.01); *F01D 25/183* (2013.01); *F05D 2220/32* (2013.01); *F05D 2240/55* (2013.01); *F05D 2240/60* (2013.01); *F05D 2240/61* (2013.01)

(58) Field of Classification Search
CPC .... F01D 25/183; F01D 11/003; F01D 11/025; F05D 2240/55; F05D 2240/60; F16J 15/442; F16J 15/441
USPC ..... 277/305, 585, 579, 580, 581; 415/170.1, 415/173.3, 174.2
See application file for complete search history.

(56) References Cited

U.S. PATENT DOCUMENTS

| | | | | |
|---|---|---|---|---|
| 1,033,237 | A | * | 7/1912 | DeFerranti ............ F01D 11/005 277/416 |
| 3,124,502 | A | * | 3/1964 | Radke ...................... F16J 15/20 277/536 |
| 3,813,103 | A | * | 5/1974 | Wiese .................. F16J 15/3412 277/361 |
| 4,211,424 | A | * | 7/1980 | Stein ..................... F01D 11/003 277/352 |
| 4,405,134 | A | * | 9/1983 | Sargent .................. F16J 15/441 277/422 |

(Continued)

FOREIGN PATENT DOCUMENTS

| | | | |
|---|---|---|---|
| FR | 2 388 181 A1 | 11/1978 | |
| GB | 2097490 A | * 11/1982 | ............. F16J 15/441 |
| WO | WO-2016179608 A2 | * 11/2016 | ............... F16J 15/44 |

OTHER PUBLICATIONS

Extended European Search Report and Opinion issued in connection with corresponding EP Application No. 17161894.5 dated Nov. 10, 2017.

*Primary Examiner* — Eugene G Byrd
(74) *Attorney, Agent, or Firm* — Dority & Manning, P.A.

(57) ABSTRACT

A seal assembly for use between an inner shaft and an outer shaft rotatable about a common axis within a turbine engine includes a pair of end rings and a plurality of seal elements coupled between the pair of end rings. Each end ring includes a flange extending in an axial direction, and each seal element includes a pair of shoulders extending in opposing axial directions. The seal assembly also includes a pair of retaining rings. Each retaining ring is positioned between one shoulder of the pair of shoulders and a corresponding one end ring flange of the pair of end ring flanges.

20 Claims, 4 Drawing Sheets

(56) References Cited

U.S. PATENT DOCUMENTS

| | | | | |
|---|---|---|---|---|
| 4,750,746 A * | 6/1988 | Boudot | F01D 11/00 | 277/578 |
| 4,752,077 A * | 6/1988 | Hoffelner | F16J 15/162 | 277/367 |
| 5,603,510 A * | 2/1997 | Sanders | F01D 11/025 | 277/413 |
| 6,070,881 A * | 6/2000 | Longree | F16J 15/40 | 277/409 |
| 6,109,617 A * | 8/2000 | Laney | F16J 15/3484 | 277/369 |
| 6,331,006 B1 * | 12/2001 | Baily | F01D 11/08 | 277/355 |
| 6,378,873 B1 * | 4/2002 | Mayer | F16J 15/28 | 277/355 |
| 6,431,550 B1 * | 8/2002 | Tong | F16J 15/442 | 277/346 |
| 6,547,522 B2 * | 4/2003 | Turnquist | F01D 11/122 | 415/173.3 |
| 6,622,490 B2 * | 9/2003 | Ingistov | F01D 11/001 | 277/355 |
| 6,715,766 B2 * | 4/2004 | Kirby, III | F16J 15/441 | 277/411 |
| 7,055,826 B2 * | 6/2006 | Stewart, Jr. | F16C 33/76 | 277/358 |
| 7,140,109 B2 * | 11/2006 | Dourlens | F16C 17/03 | 29/898.02 |
| 7,287,956 B2 * | 10/2007 | Bracken | F01D 5/225 | 415/173.3 |
| 7,549,834 B2 * | 6/2009 | Kirchhof | F04D 29/102 | 415/1 |
| 7,726,940 B2 * | 6/2010 | Snowsill | F16J 15/442 | 277/413 |
| 7,918,461 B1 * | 4/2011 | MacGregor | F01D 11/025 | 277/413 |
| 8,113,771 B2 * | 2/2012 | Turnquist | F01D 11/025 | 277/411 |
| 8,205,891 B2 * | 6/2012 | Vasagar | F01D 11/003 | 277/579 |
| 8,356,821 B2 * | 1/2013 | Freal | F16J 15/162 | 277/578 |
| 8,459,653 B2 | 6/2013 | Zheng | | |
| 8,820,752 B2 * | 9/2014 | Garrison | F01D 11/003 | 277/579 |
| 8,888,441 B2 | 11/2014 | Jordy et al. | | |
| 9,004,495 B2 | 4/2015 | Vasagar | | |
| 9,803,650 B2 * | 10/2017 | Wygant | F04D 29/4206 | |
| 9,850,770 B2 * | 12/2017 | Garrison | F01D 11/003 | |
| 2005/0206249 A1 * | 9/2005 | Hashiba | F16J 15/26 | 310/54 |
| 2007/0053772 A1 * | 3/2007 | Couture, Jr. | F01D 11/001 | 415/173.3 |
| 2007/0085278 A1 * | 4/2007 | Davis | F01D 25/183 | 277/411 |
| 2007/0090606 A1 * | 4/2007 | Ross | F04B 15/08 | 277/500 |
| 2009/0051124 A1 * | 2/2009 | Kakehi | F16J 15/3272 | 277/581 |
| 2012/0243977 A1 * | 9/2012 | Simonet | F01D 9/041 | 415/173.3 |
| 2012/0261887 A1 * | 10/2012 | Vasagar | F01D 11/003 | 277/543 |
| 2016/0115806 A1 | 4/2016 | Davis et al. | | |

\* cited by examiner

INTERSHAFT SEALING SYSTEMS FOR GAS TURBINE ENGINES AND METHODS FOR ASSEMBLING THE SAME

STATEMENT REGARDING FEDERALLY SPONSORED RESEARCH AND DEVELOPMENT

This invention was made with Government support under contract number FA8650-09-D-2922 awarded by the United States Air Force. The Government has certain rights in this invention.

BACKGROUND

The present disclosure generally relates to systems and methods of intershaft sealing in an aircraft engine. More particularly, this disclosure relates to intershaft seal assemblies capable of providing a seal between inner and outer shafts rotatable about a common axis.

At least some known gas turbine engines, such as turbofans, include a fan, a core engine, and a power turbine. The core engine includes at least one compressor, a combustor, and a high-pressure turbine coupled together in a serial flow relationship. More specifically, the compressor and high-pressure turbine are coupled through a shaft to form a high-pressure rotor assembly. Air entering the combustor is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a drive shaft. The low-pressure turbine rotatably drives the fan through the drive shaft.

The compressor and the turbine are generally coupled through a number of co-axial shafts that include at least one intershaft ring seal assembly. At least some known ring seals are coupled to, and rotate with, the inner shaft. When a ring seal is installed within an intershaft system, the seal exerts a small force onto the inner diameter of the outer shaft. During operation, at least some known ring seals contact the outer shaft and spin within a channel formed in the inner shaft. Radial loads along the ring seal are influenced by the pressure between the shafts and centrifugal forces acting on the seal. Axial loads along the ring seal are influenced by the pressure component.

BRIEF DESCRIPTION

In one aspect, a seal assembly for use between an inner shaft and an outer shaft rotatable about a common axis within a turbine engine is provided. The seal assembly includes a pair of end rings and a plurality of seal elements coupled between the pair of end rings. Each end ring includes a flange extending in an axial direction, and each seal element includes a pair of shoulders extending in opposing axial directions. The seal assembly also includes a pair of retaining rings. Each retaining ring is positioned between one shoulder of the pair of shoulders and a corresponding one end ring flange of the pair of end ring flanges.

In another aspect, a sealing system for a gas turbine engine having a sump region is provided. The sealing system includes an inner shaft and an outer shaft rotatable about a common axis with the inner shaft. The sealing system also includes a seal assembly coupled to the inner shaft and configured to seal a high pressure area of the sump region from a low pressure area of the sump region. The seal assembly includes a pair of end rings and a plurality of seal elements coupled between the pair of end rings. Each end ring includes a flange extending in an axial direction, and each seal element includes a pair of shoulders extending in opposing axial directions. The seal assembly also includes a pair of retaining rings. Each retaining ring is positioned between one shoulder of the pair of shoulders and a corresponding one end ring flange of the pair of end ring flanges.

In yet another aspect, a method of assembling a seal system for a turbine engine is provided. The method includes positioning an outer shaft radially outward from an inner shaft to define a gap therebetween such that the inner shaft and the outer shaft are rotatable about a common axis. The method also includes coupling a pair of end rings to the inner shaft, wherein each end ring includes a flange extending in an axial direction. A plurality of seal elements are coupled between the end rings, wherein each seal element includes a pair of shoulders extending in opposing axial directions. The method also includes coupling a pair of retaining rings between one shoulder of the pair of shoulders and a one end ring flange of the pair of end ring flanges.

DRAWINGS

These and other features, aspects, and advantages of the present disclosure will become better understood when the following detailed description is read with reference to the accompanying drawings in which like characters represent like parts throughout the drawings, wherein.

Figure 1:
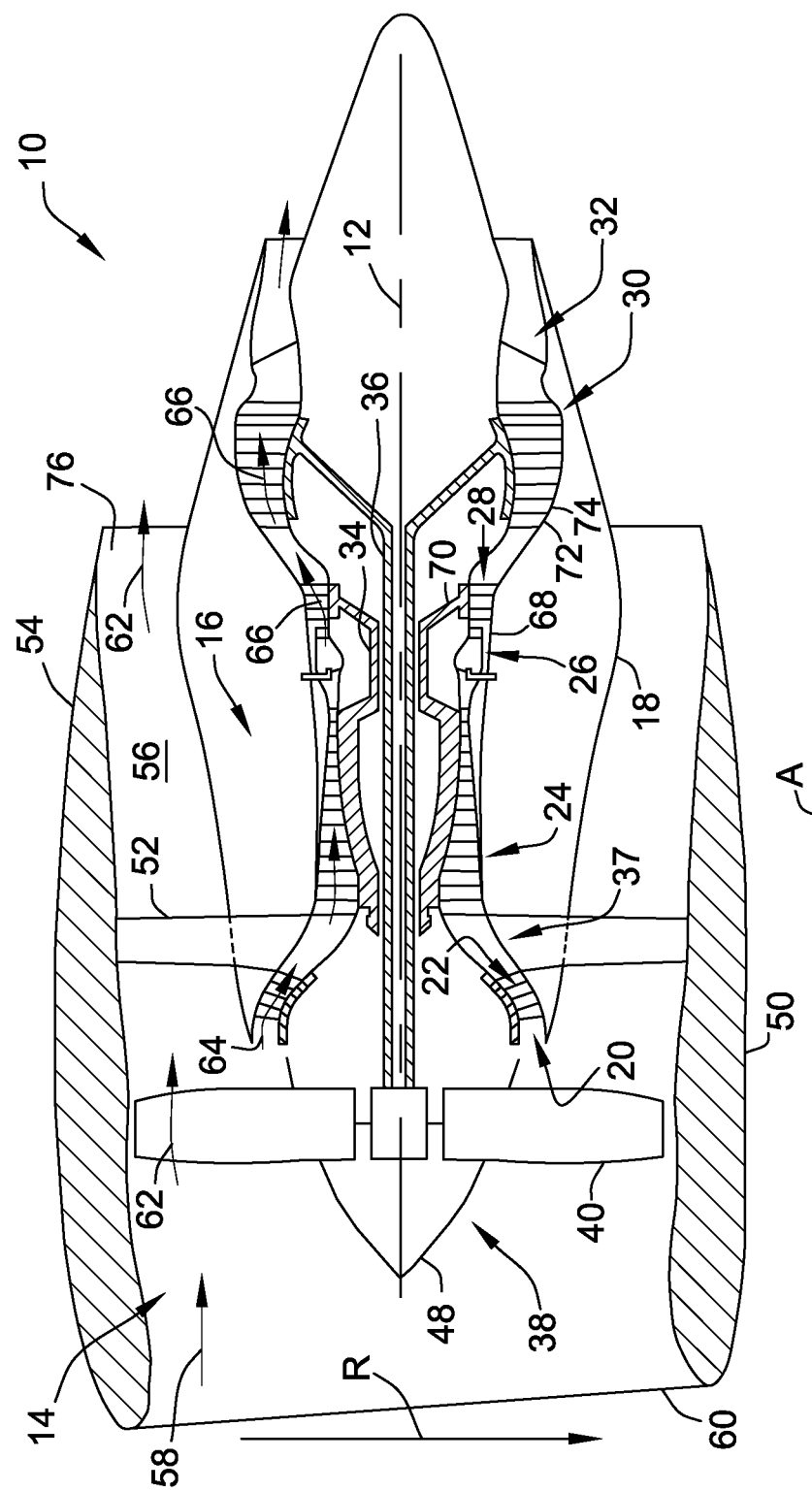
FIG. 1 is a schematic, cross-sectional view of an exemplary gas turbine engine.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extends substantially parallel to a centerline of the turbine engine. Moreover, the terms "radial" and "radially" refer to directions and orientations that extends substantially perpendicular to the centerline of the turbine engine. Furthermore, the terms "forward" and "aft" are used herein to refer to general directions and orientations of fluid flow through the engine, wherein "forward" is toward an engine inlet end and "aft" is toward an engine exhaust end.

The exemplary apparatus and methods described herein overcome at least some disadvantages of known sealing systems for use in a gas turbine engine. Moreover, the sealing systems and methods described herein enable sealing between co-rotating or counter-rotating shafts in a turbine engine. More specifically, the seal system described herein includes an inner shaft, an outer shaft, and a seal assembly coupled between the inner shaft and the outer shaft. The seal assembly includes a pair of end rings that each include a flange extending in an axial direction. A plurality of seal elements are coupled between the end rings and each include a pair of shoulders extending in opposing axial directions. The seal assembly also includes a pair of retaining rings such that each retaining ring is positioned between one shoulder of the pair of seal element shoulders and one flange of the pair of end ring flanges.

Advantages of the systems and methods described herein include the ability to reduce the amount of leakage between the inner shaft and the outer shaft as compared to conventional labyrinth seals. Such a reduction in leakage under the same or similar high pressure differential results in less being bled off compressor, resulting in a higher efficiency of the engine. Additionally, the above described intershaft sealing system has a longer service lifetime as compared to conventional piston ring seals, resulting in a reduction in operating and maintenance costs for the engine. Another advantage of the above described intershaft sealing system is the reduced weight as compared to conventional circumferential or face-aspirating carbon seals, especially those having two independent stationary seals for the inner and outer shafts, respectively. The reduced weight also results in increasing the efficiency of the engine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, turbofan engine 10 defines an axial direction A (extending parallel to a longitudinal centerline 12 provided for reference) and a radial direction R. In general, turbofan 10 includes a fan section 14 and a core turbine engine 16 disposed downstream from fan section 14.

Core turbine engine 16 depicted generally in FIG. 1 includes a substantially tubular outer casing 18 that defines an annular inlet 20. Outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects HP turbine 28 to HP compressor 24. A low pressure (LP) shaft or spool 36 drivingly connects LP turbine 30 to LP compressor 22. The compressor section, combustion section 26, turbine section, and nozzle section 32 together define a core air flowpath 37.

For the embodiment depicted, fan section 14 includes a fan 38 having a plurality of fan blades 40. A rotatable front hub 48 is aerodynamically contoured to promote airflow through fan blades 40 and is positioned at a forward end of fan section 14. Additionally, exemplary fan section 14 includes an annular fan casing or outer nacelle 50 that circumferentially surrounds fan 38 and/or at least a portion of core turbine engine 16. It should be appreciated that nacelle 50 may be configured to be supported relative to core turbine engine 16 by a plurality of circumferentially-spaced outlet guide vanes 52. Moreover, in one embodiment, a downstream section 54 of nacelle 50 extends over an outer portion of core turbine engine 16 so as to define a bypass airflow passage 56 therebetween.

During operation of turbofan engine 10, a volume of air 58 enters turbofan 10 through an associated inlet 60 of nacelle 50 and/or fan section 14. As volume of air 58 passes across fan blades 40, a first portion of air 58, as indicated by arrows 62, is directed or routed into bypass airflow passage 56 and a second portion of air 58 as indicated by arrow 64 is directed or routed into core air flowpath 37, or more specifically into LP compressor 22. The ratio between first portion of air 62 and second portion of air 64 is commonly known as a bypass ratio. The pressure of second portion of air 64 is then increased as it is routed through high pressure (HP) compressor 24 and into combustion section 26, where it is mixed with fuel and burned to provide combustion gases 66.

Combustion gases 66 are routed through HP turbine 28 where a portion of thermal and/or kinetic energy from combustion gases 66 is extracted via sequential stages of HP turbine stator vanes 68 that are coupled to outer casing 18 and HP turbine rotor blades 70 that are coupled to HP shaft or spool 34, thus causing HP shaft or spool 34 to rotate, thereby supporting operation of HP compressor 24. Combustion gases 66 are then routed through LP turbine 30 where a second portion of thermal and kinetic energy is extracted from combustion gases 66 via sequential stages of LP turbine stator vanes 72 that are coupled to outer casing 18 and LP turbine rotor blades 74 that are coupled to LP shaft or spool 36, thus causing LP shaft or spool 36 to rotate, thereby supporting operation of LP compressor 22 and/or rotation of fan 38.

Combustion gases 66 are subsequently routed through jet exhaust nozzle section 32 of core turbine engine 16 to provide propulsive thrust. Simultaneously, the pressure of first portion of air 62 is substantially increased as first portion of air 62 is routed through bypass airflow passage 56 before it is exhausted from a fan nozzle exhaust section 76 of turbofan 10, also providing propulsive thrust. HP turbine 28, LP turbine 30, and jet exhaust nozzle section 32 at least partially define a hot gas path 78 for routing combustion gases 66 through core turbine engine 16.

It should be appreciated, however, that turbofan engine 10 depicted in FIG. 1 is provided by way of example only and that in other exemplary embodiments, turbofan engine 10 may have any other suitable configuration. For example, in other embodiments, turbofan engine 10 may be configured as a geared turbofan engine, such that LP shaft 36 drives fan 38 across a power gearbox. Additionally, or alternatively, turbofan engine 10 may be an unducted/open rotor turbofan engine. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, electric propulsion systems, etc.

Figure 2:
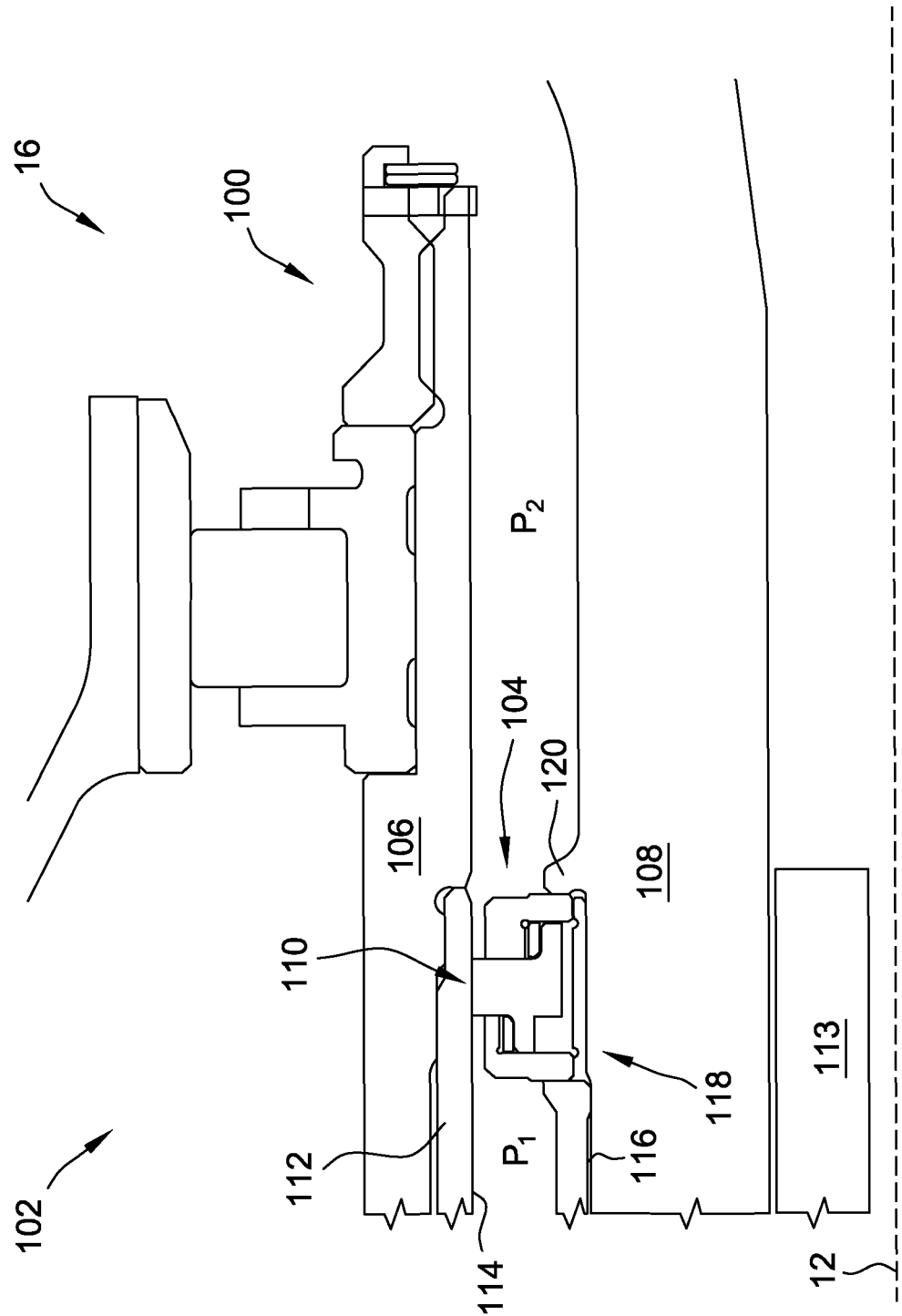
FIG. 2 is a schematic, cross-sectional side view of a sump region of a core of the exemplary gas turbine engine shown in FIG. 1 illustrating an exemplary sealing system.

Referring now to FIG. 2, a schematic, cross-sectional side view of a sump region 100 of core 16 of gas turbine engine 10 (shown in FIG. 1) is provided illustrating an exemplary sealing system 102 including a seal assembly 104. As shown in FIG. 2, sealing system 102 seals a higher pressure area P1 on a forward side of seal assembly 104 from a lower pressure area P2 on an aft side of seal assembly 104. In the exemplary embodiment, sealing system 102 includes an outer shaft 106 and an inner shaft 108 that rotate in either a counter-rotational or co-rotational fashion about axis 12. Seal assembly 104 is coupled to inner shaft 108 such that a radial gap 110 is defined between seal assembly 104 and outer shaft 106. More specifically, outer shaft 106 includes a seal runner 112 positioned radially outward from seal assembly 104 and having an inner surface 114 spaced from seal assembly during certain operating conditions of engine 10 to at least partially define gap 110. Furthermore, outer shaft 106 also includes an oil distributor 113 positioned radially inward of seal assembly 104 for facilitating flow of oil within sump region 100. Alternatively, seal assembly 104 is used between any type of inner and outer shafts and is not limited to use within an oil sump.

Additionally, inner shaft 108 includes a seal carrier 116 that supports seal assembly 104. More specifically, seal carrier 116 forms a recess 118 that receives seal assembly 104. Alternatively, or in addition, seal carrier 116 includes a retention feature 120 that retains seal assembly in an axial position. In the exemplary embodiment, retention feature 120 includes at least one of a mechanical stop integral with inner shaft 108 or seal carrier 116 or a distinct locking ring coupled to one of inner shaft 108 or seal carrier 116. Generally, retention feature 120 is any feature that enables operation of seal assembly 104 as described herein.

Figure 3:
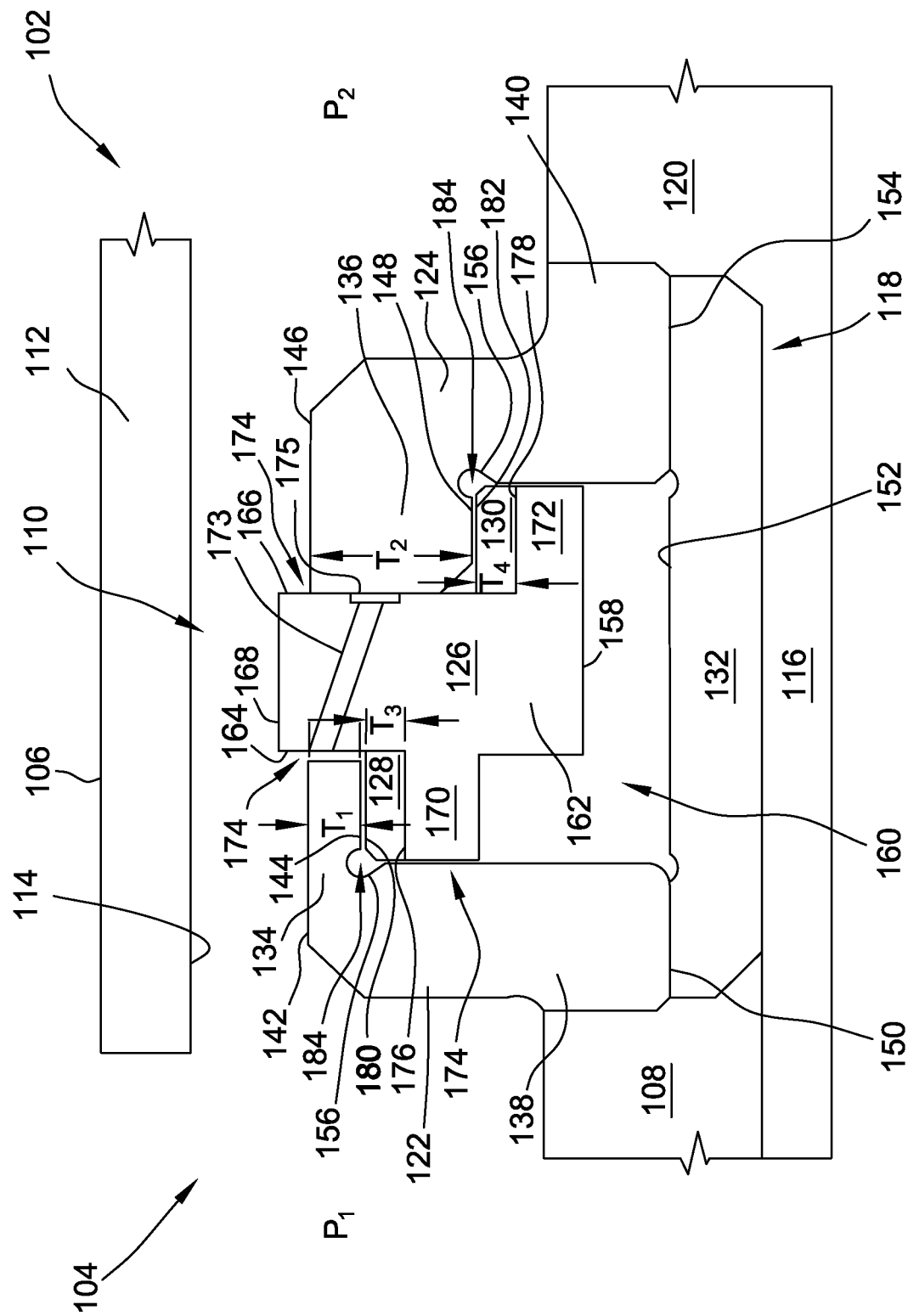
FIG. 3 is a cross-sectional view of an exemplary seal assembly that may be used with the sealing system shown in FIG. 2.
Figure 4:
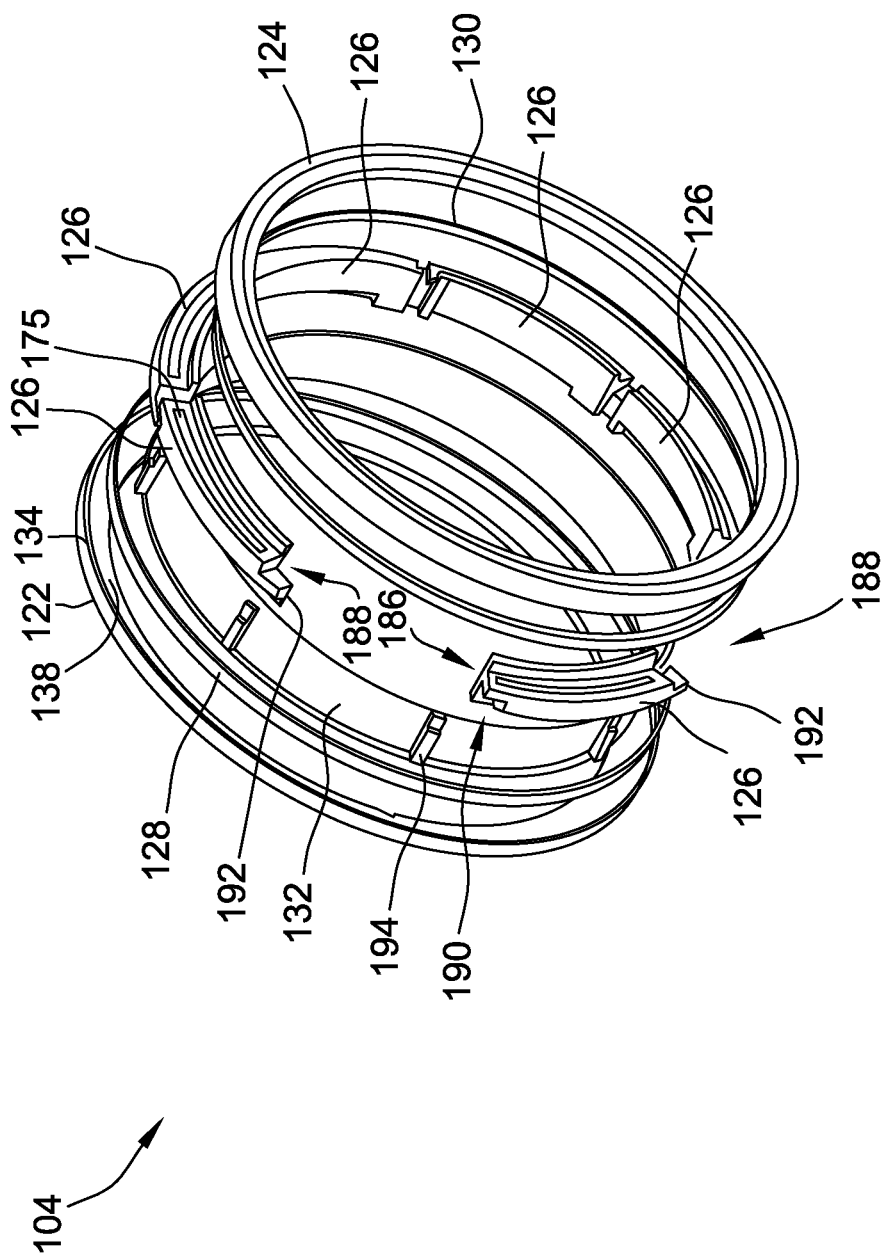
FIG. 4 is a perspective, exploded view of the seal assembly shown in FIG. 3.

FIG. 3 is a cross-sectional view of seal assembly 104 that may be used with sealing system 102 shown in FIG. 2, and FIG. 4 is a perspective, exploded view of seal assembly 104 shown in FIG. 3. In the exemplary embodiment, seal assembly 104 seals a higher pressure area P1 on a forward side of seal assembly 104 from a lower pressure area P2 on an aft side of seal assembly 104 and includes a forward end ring 122, an aft end ring 124, a plurality of seal elements 126, a forward retaining ring 128, an aft retaining ring 130, and a spacer ring 132.

In the exemplary embodiment, each end ring 122 and 124 includes a flange 134 and 136, respectively, extending in an axial direction so as to have a substantially L-shaped cross section. End rings 122 and 124 are positioned in a substantially symmetrical arrangement about seal elements 126 and each include a body portion 138 and 140, respectively, from which flanges 134 and 136 extend so that flanges 134 and 136 are positioned immediately adjacent to but do not contact runner 112 of outer shaft 106. Additionally, in the exemplary embodiment, forward flange 134 includes an outer surface 142 proximate runner 112 of outer shaft 106 and an inner surface 144 such that a flange thickness T1 is defined therebetween. Similarly, aft flange 136 includes an outer surface 146 proximate runner 112 of outer shaft 106 and an inner surface 148 such that a flange thickness T2 is defined therebetween that is larger than flange thickness T1 of forward flange 134.

In the exemplary embodiment, forward ring body portion 138 includes an inner surface 150 that contacts an outer surface 152 of spacer ring 132. Similarly, aft ring body portion 140 includes an inner surface 154 that contacts outer surface 152 of spacer ring 132. As such, end rings 122 and 124 are spaced from inner shaft 108, and more specifically seal carrier 116, by spacer ring 132. Furthermore, each end ring 122 and 124 may include a relief 156 at a circumferential intersection of its respective flange 134 and 136 and body portions 138 and 140. Relief 156 facilitates preventing or easing stress concentrations within end rings 122 and 124 and fit and wear problems with seal element 126. Relief 156 may be a radius, a chamfer, or any other stress-relieving shape.

As shown in FIG. 3, spacer ring 132 is coupled within recess 118 of seal carrier 116 of inner shaft 108. In the exemplary implementation, spacer ring 132 is the radially innermost component of seal assembly 104. More specifically, outer surface 152 of spacer ring 132 is positioned radially inward of an inner surface 158 of each seal element 126 such that an annular gap 160 is defined between surfaces 152 and 158. Gap 160 is dimensioned so as to avoid contact between inner surface 158 of seal element 126 and outer surface 152 of spacer ring 132 during excursions of inner and outer shafts 106 and 108.

In the exemplary embodiment, each seal element 126 includes a body portion 162 having a forward surface 164, an aft surface 166, an outer surface 168, and inner surface 158. Seal element 126 also includes a forward shoulder 170 extending from forward surface 164 in the axial direction and an aft shoulder 172 extending from aft surface 166 in the axial direction such that shoulders 170 and 172 and body portion 162 may be integrally formed. In the exemplary embodiment, forward shoulder 170 is radially offset from aft shoulder 172. More specifically, forward shoulder 170 has a larger diameter with respect to axis 12 than aft shoulder 172. Such an offset facilitates pressure balancing seal element 126 to reduce axial pressure force on aft surface 166 and allows seal segment 126 to move up and down more easily under pressure. Outer surface 168 is the sealing surface of seal assembly 104 and is positioned proximate inner surface 114 of runner 112 of outer shaft 106 such that gap 110 is defined outer surface 168 and inner surface 114. The size of gap 110 is sufficient to limit contact between runner 112 of outer shaft 106 and seal element 126 and to minimize gas leakage across seal assembly 104.

Furthermore, body portion 162 may include a plurality of through holes 173 that extend obliquely through body portion 162 proximate flanges 134 and 136. More specifically, aft surface 166 includes a groove 175 defined therein and holes 173 extend from forward surface 164 through body portion 162 to groove 175. In the exemplary implementation, each seal element 126 includes three through holes 173. Alternatively, each seal element 126 includes any number of through holes 173 to facilitate operation of seal assembly 104 as described herein. In operation, high pressure fluid flows through holes 173 and impinges on aft flange 136 to provide a cushion that prevents seal element 126 from impacting aft end ring 124 with a large force.

As shown in FIG. 3, seal elements 126 are positioned axially between end rings 122 and 124. In some embodiments, a gap 174 is defined between at least one of forward flange 134 and forward surface 164 (as shown in FIG. 3) and between aft flange 136 and aft surface 166 to ensure that seal element 126 floats inside seal assembly 104 and has sufficient axial motion to properly adjust with engine operational effects, such as pressure, temperature, and speed. In other embodiments, gap 174 could be defined between at least one of adjacent vertical walls of end rings 122 and 124 and corresponding shoulder 170 and 172, respectively.

In the exemplary embodiment, forward retaining ring 128 is positioned between forward shoulder 170 and flange 134 of forward end ring 122. Similarly, aft retaining ring 130 is positioned between aft shoulder 172 and flange 136 of aft end ring 124. More specifically, forward retaining ring 128 is coupled to an outer surface 176 of forward shoulder 170 and aft retaining ring 130 is coupled to an outer surface 178 of aft shoulder 172. As shown in FIG. 3, forward retaining ring 128 includes a thickness T3 that is substantially equal to a thickness T4 of aft retaining ring 130. Alternatively, retaining rings 128 and 130 include any thickness that facilitates operation of seal assembly 104 as described herein. Generally, retaining rings 128 and 130 include any thickness that facilitates operation of seal assembly 104 as described herein.

Additionally, forward retaining ring 128 includes an outer surface 180 that is positioned radially outward from an outer surface 182 of aft retaining ring 130. As such, forward retaining ring 128 includes a diameter with respect to axis 12 that is larger than a diameter of aft retaining ring 130. In the exemplary embodiment, under certain operating conditions of engine 10, a gap 184 is defined between at least one of outer surface 180 of forward retaining ring 128 and inner surface 144 of flange 134 and between outer surface 182 of aft retaining ring 130 and inner surface 148 of flange 136. For example, gap 184 is within a range of approximately 0.01 inches (in.) and approximately 0.050 in. More specifically, gap 184 is within a range of approximately 0.02 inches and approximately 0.04 in. Even more specifically, gap 184 is approximately 0.030 in. Although not as shown in FIG. 3, in the exemplary embodiment, gap 184 is larger than gap 110. Additionally, gap 160 is larger than gap 184 to prevent contact of surfaces 152 and 158.

In operation, gap 184 enables rings 128 and 130 and seal elements 126 to move radially during different operating conditions. During rotation of inner shaft 108, centrifugal force causes the plurality of seal elements 126 to behave as solid ring rather than a plurality of individual segments. Under low eccentricity engine operating conditions, the seal elements 126 and retaining rings 128 and 130 move radially outward until gap 110 is closed locally causing outer surface 168 to impact inner surface 114 of the seal runner 112 with low force. The seal operates in this manner until the engine operating conditions create an eccentricity value larger than the initial gap size set for gap 184. When this gap size is exceeded, individual segments of seal elements 126 will no longer be held by the retaining rings 128 and 130. Those segments will close gap 110 locally causing outer surface 168 to impact the inner surface 114 of the seal runner 112 with a large force on that individual segment.

Furthermore, in the exemplary embodiment, seal elements 126 may be formed from a non-metallic carbon material. Additionally, end rings 122 and 124, retaining rings 128 and 130, and spacer ring 132 may be formed from the same material. More specifically, end rings 122 and 124, retaining rings 128 and 130, and spacer ring 132 may be formed from the same material such that they have similar coefficients of thermal expansion to enable end rings 122 and 124, retaining rings 128 and 130, and spacer ring 132 to expand and contract at similar rates. In the exemplary embodiment, end rings 122 and 124, retaining rings 128 and 130, and spacer ring 132 are formed from nickel-chromium superalloys containing carbon. Alternatively, end rings 122 and 124, retaining rings 128 and 130, and spacer ring 132 are formed from any material that facilitates operation of seal assembly 104 as described herein.

As shown in FIG. 4, each seal element 126 also includes a first circumferential end 186 and an opposing second circumferential end 188. First circumferential end 186 includes a recessed groove portion 190 and second circumferential end 188 includes a mating tongue portion 192 configured to extend circumferentially. As such, second end tongue portion 192 of one seal element 126 complements first end groove portion 190 of a circumferentially adjacent seal element 126 such that tongue portion 192 and groove portion 190 form a zero-clearance seal between adjacent seal elements 126. Additionally, spacer ring 132 includes a plurality of drive features 194 that are coupled to seal elements 126 to force seal elements 126 to rotate with inner shaft 108 rotation. More specifically, each seal element 126 is engaged by drive feature 194 proximate at least one of circumferential ends 186 and 188. In the exemplary embodiment, drive feature 194 includes at least one of a tab or a pin that engages seal elements 126 to drive rotation of seal elements 126 with spacer ring 132 and to prevent rotation of seal elements 126 relative to spacer ring 132.

The exemplary apparatus and methods described herein overcome at least some disadvantages of known sealing systems for use in a gas turbine engine. Moreover, the sealing systems and methods described herein enable sealing between co-rotating or counter-rotating shafts in a turbine engine. More specifically, the seal system described herein includes an inner shaft, and outer shaft, and a seal assembly coupled between the inner shaft and the outer shaft. The seal assembly includes a pair of end rings that each include a flange extending in an axial direction. A plurality of seal elements are coupled between the end rings and each include a pair of shoulders extending in opposing axial directions. The seal assembly also includes a pair of retaining rings such that each retaining ring is positioned between one shoulder of the pair of seal element shoulders and a one flange of the pair of end ring flanges.

A technical effect of the above described intershaft sealing system is the ability to reduce the amount of leakage between the inner shaft and the outer shaft as compared to conventional labyrinth seals. Such a reduction in leakage under the same or similar high pressure differential results in less being bled off compressor, resulting in a higher efficiency of the engine. Additionally, the above described intershaft sealing system has a longer service lifetime as compared to conventional piston ring seals, resulting in a reduction in operating and maintenance costs for the engine. Another advantage of the above described intershaft sealing system is the reduced weight as compared to conventional circumferential or face-sealing carbon seals, especially those having two independent stationary seals for the inner and outer shafts, respectively. The reduced weight also results in increasing the efficiency of the engine.

Exemplary embodiments of intershaft sealing systems are described above in detail. The intershaft sealing systems, and methods of assembling such systems and devices are not limited to the specific embodiments described herein, but rather, components of systems and/or steps of the methods may be utilized independently and separately from other components and/or steps described herein. For example, the methods may also be used in combination with other systems requiring intershaft sealing systems, and are not limited to practice with only the turbine engine system and methods as described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A seal assembly for use between an inner shaft and an outer shaft rotatable about a common axis within a turbine engine, said seal assembly comprising:
   a pair of end rings, each said end ring comprising a flange extending in an axial direction;
   a plurality of seal elements coupled between said end rings, wherein each seal element comprises a pair of shoulders extending in opposing axial directions;
   a pair of retaining rings, wherein each retaining ring is positioned between one shoulder of said pair of shoulders and one end ring flange of said pair of end ring flanges, and wherein each retaining ring is connected to an outer surface of one of said pair of shoulders; and
   a spacer ring coupled to said pair of end rings and positioned radially inward of said pair of end rings and said plurality of seal elements, wherein the spacer ring includes one or more drive features directly coupled to at least one of the seal elements such that the one or more drive features drive rotation of the plurality of seal elements with the inner shaft.

2. The seal assembly of claim 1, wherein said pair of shoulders comprises a forward shoulder and an aft shoulder and said pair of retaining rings comprises a forward retaining ring and an aft retaining ring.

3. The seal assembly of claim 2, wherein said forward retaining ring comprises a first thickness and said aft retaining ring comprises a second thickness substantially equal to the first thickness.

4. The seal assembly of claim 2, wherein said forward retaining ring comprises a first diameter and said aft retaining ring comprises a second diameter smaller than the first diameter.

5. The seal assembly of claim 2, wherein said forward shoulder is radially offset from said aft shoulder.

6. The seal assembly of claim 1, wherein said pair of end rings and said pair of retaining rings are formed from the same material.

7. The seal assembly of claim 1, wherein the one or more drive features comprises at least one of a tab or pin such that the spacer ring is engaged with at least one of the seal elements.

8. The seal assembly of claim 1, wherein each seal element comprises a body portion from which said pair of shoulders extend in the axial direction, said body portion comprising a sealing surface such that a gap is defined between said sealing surface and the outer shaft.

9. A sealing system for a gas turbine engine having a sump region, said sealing system comprising:
   an inner shaft;
   an outer shaft rotatable about a common axis with said inner shaft; and
   a seal assembly coupled to said inner shaft and configured to seal a high pressure area of the sump region from a low pressure area of the sump region, said seal assembly comprising:
      a pair of end rings, each said end ring comprising a flange extending in an axial direction;
      a plurality of seal elements coupled between said end rings, wherein each seal element comprises a pair of shoulders extending in opposing axial directions;
      a pair of retaining rings, wherein each retaining ring is positioned between one shoulder of said pair of shoulders and one end ring flange of said pair of end ring flanges, and wherein each retaining ring is connected to an outer surface of one of said pair of shoulders; and
      a spacer ring coupled to said pair of end rings and positioned radially inward of said pair of end rings and said plurality of seal elements, wherein the spacer ring includes one or more drive features directly coupled to at least one of the seal elements such that the one or more drive features drive rotation of the plurality of seal elements with the inner shaft.

10. The sealing system of claim 9, wherein said pair of shoulders comprises a forward shoulder and an aft shoulder and said pair of retaining rings comprises a forward retaining ring and an aft retaining ring.

11. The sealing system of claim 10, wherein said forward retaining ring comprises a first diameter and said aft retaining ring comprises a second diameter smaller than the first diameter.

12. The sealing system of claim 9, wherein said pair of end rings and said pair of retaining rings are formed from the same material.

13. The sealing system of claim 9, wherein the one or more drive features comprises at least one of a tab or pin such that the spacer ring is engaged with at least one of the seal elements.

14. The sealing system of claim 9, wherein each seal element comprises a body portion from which said pair of shoulders extend in the axial direction, said body portion comprising a sealing surface such that a gap is defined between said sealing surface and an inner surface of said outer shaft.

15. The sealing system of claim 9, wherein said outer shaft comprises a seal runner positioned radially outward of said seal assembly.

16. The sealing system of claim 14, wherein said outer shaft comprises an oil distributor positioned radially inward of said seal assembly.

17. The sealing system of claim 9, wherein said inner shaft comprises a seal carrier configured to support said seal assembly.

18. A method of assembling a sealing system for a turbine engine, said method comprising:
- positioning an outer shaft radially outward from an inner shaft to define a gap therebetween such that the inner shaft and the outer shaft are rotatable about a common axis;
- coupling a pair of end rings to the inner shaft, each end ring including a flange extending in an axial direction;
- coupling a plurality of seal elements between the end rings, wherein each seal element includes a pair of shoulders extending in opposing axial directions;
- coupling a spacer ring to the inner shaft and to the pair of end rings such that that the spacer ring is positioned radially inward of the seal element to define a gap therebetween;
- directly coupling the spacer ring to at least one of the plurality of seal elements via one or more drive features of the spacer ring such that the one or more drive features drive rotation of the plurality of seal elements with the inner shaft;
- positioning a pair of retaining rings between one shoulder of the pair of shoulders and one end ring flange of the pair of end ring flanges; and
- connecting each of the pair of retaining rings to an outer surface of one shoulder of the pair of shoulders.

19. The method of claim 18, wherein coupling a seal element comprises coupling a seal element such that a gap is defined between a sealing surface of the seal element and an inner surface along the radial direction of the outer shaft.

20. The method of claim 18, wherein the one or more drive features comprises at least one of a tab or pin such that the spacer ring is engaged with at least one of the seal elements.

\* \* \* \* \*